United States Patent
Liu et al.

(10) Patent No.: US 12,328,510 B2
(45) Date of Patent: Jun. 10, 2025

(54) ACTIVE POSITIONING METHOD FOR BIONIC BINOCULAR VISION DURING EXECUTION OF SLAM TASK

(71) Applicants: Jining University, Jining (CN); Shanghai University, Shanghai (CN)

(72) Inventors: Jun Liu, Jining (CN); Hengyu Li, Shanghai (CN); Lei Wan, Shanghai (CN); Jingyi Liu, Shanghai (CN); Yueying Wang, Shanghai (CN); Shaorong Xie, Shanghai (CN); Jun Luo, Shanghai (CN)

(73) Assignees: Jining University, Jining (CN); Shanghai University, Shanghai (CN)

( * ) Notice: Subject to any disclaimer, the term of this patent is extended or adjusted under 35 U.S.C. 154(b) by 79 days.

(21) Appl. No.: 18/394,344

(22) Filed: Dec. 22, 2023

(65) Prior Publication Data
US 2025/0071426 A1  Feb. 27, 2025

(30) Foreign Application Priority Data
Aug. 23, 2023 (CN) .......................... 202311067612.8

(51) Int. Cl.
*H04N 23/698* (2023.01)
*H04N 13/156* (2018.01)
*H04N 13/239* (2018.01)
*H04N 13/271* (2018.01)
*H04N 13/296* (2018.01)
*H04N 13/00* (2018.01)

(52) U.S. Cl.
CPC ......... *H04N 23/698* (2023.01); *H04N 13/156* (2018.05); *H04N 13/239* (2018.05); *H04N 13/271* (2018.05); *H04N 13/296* (2018.05); *H04N 2013/0081* (2013.01)

(58) Field of Classification Search
CPC .. H04N 23/698; H04N 13/156; H04N 13/239; H04N 13/271; H04N 13/296; H04N 2013/0081; G06T 7/73; G06T 2207/30244; G06V 10/82; G06V 20/00
USPC ......................................................... 348/38
See application file for complete search history.

(56) References Cited

U.S. PATENT DOCUMENTS

| 9,674,507 | B2 * | 6/2017 | Pirchheim | ............... G06T 7/579 |
| 11,592,829 | B2 * | 2/2023 | Kobayashi | ........... G05D 1/0221 |
| 2015/0304634 | A1 * | 10/2015 | Karvounis | ........ G06F 18/21355 348/46 |

* cited by examiner

*Primary Examiner* — Susan E. Hodges
(74) *Attorney, Agent, or Firm* — Nixon Peabody LLP

(57) ABSTRACT

Disclosed is an active positioning method for bionic binocular vision during execution of a simultaneous localization and mapping (SLAM) task. The method includes: capturing a panoramic image using a panoramic camera and detecting key scene information; assigning values to pixels in the panoramic image to obtain a panoramic value map; projecting field-of-view areas of left and right bionic eye cameras separately onto the panoramic value map, to obtain a current binocular field-of-view projection area; calculating a mean value of the current binocular field-of-view projection area in the panoramic value map; comparing the mean value of the current binocular field-of-view projection area with a value threshold, and obtaining a binocular field-of-view projection area with a mean value higher than the value threshold by moving the binocular bionic cameras; and finally using a high-value image captured by the left and right bionic eye cameras as an input of a SLAM system.

20 Claims, 4 Drawing Sheets

ACTIVE POSITIONING METHOD FOR BIONIC BINOCULAR VISION DURING EXECUTION OF SLAM TASK

CROSS REFERENCE TO RELATED APPLICATION

This patent application claims the benefit of and priority to Chinese Patent Application No. 202311067612.8, which was filed with the Chinese Patent Office on Aug. 23, 2023, the disclosure of which is hereby incorporated by reference herein in its entirety.

TECHNICAL FIELD

The present disclosure relates to the technical field of robot vision, and in particular, to an active positioning method for bionic binocular vision during execution of a simultaneous localization and mapping (SLAM) task.

BACKGROUND

Eyes are one of the most important organs for humans to interact with the external environment, with over 90% of information about the external environment being obtained through the eyes. Eyes are crucial for bionic robots to correctly execute complex tasks. With the continuous development of robot vision technology, users have gradually higher demand for bionic eyes' ability to acquire external information. It is required that bionic eyes can actively obtain key information from visual information of the entire scene. However, most of the visual systems mounted on robots today simply fix visual sensors directly to the robot, resulting in a substantial gap in visual perception capabilities compared to human eyes. For instance, human eyes can achieve fast and precise gaze positioning, smooth tracking of moving targets, and stable gaze during head movement through the vestibulo-ocular reflex mechanism, which bionic eyes in robots cannot achieve.

Human vision is divided into central vision and peripheral vision: when identifying specific objects, central vision plays the most significant role, whereas when perceiving the overall scene, peripheral vision is more critical. When a robot equipped with a visual sensor runs SLAM in an unknown environment, the system passively receives image data captured by the visual sensor during motion of the robot, and perceives the pose and ambient environment of the robot according to these data. The SLAM system faces tracking failures when the images captured by the visual sensor have sparse textures or numerous dynamic objects. Therefore, inspired by the peripheral and central visual perception mechanisms of the human eye, a bionic eye system with peripheral and central vision can be constructed, such that the system has active visual capabilities. During SLAM tasks, the bionic eye can actively extract key information from visual information of the entire scene and control the motion to shift the gaze to areas with key (high-value) information.

SUMMARY

In view of the problems and shortcomings in the prior art, an objective of the present disclosure is to provide an active positioning method for bionic binocular vision during execution of a SLAM task.

To achieve the aforementioned objective, the present disclosure adopts the following technical solution:

A first aspect of the present disclosure provides an active positioning method for bionic binocular vision during SLAM task execution, including the following steps:

S100: capturing a panoramic image using a panoramic camera and detecting key scene information in the panoramic image that influences execution of a SLAM task;

S200: assigning values to pixels in the panoramic image based on the key scene information, to obtain a panoramic value map (in a pixel plane of the panoramic camera);

S300: projecting field-of-view areas of left and right bionic eye cameras separately onto the panoramic value map, to obtain a left field-of-view projection area and a right field-of-view projection area; controlling the left field-of-view projection area and the right field-of-view projection area to overlap with each other; and merging the left field-of-view projection area and the right field-of-view projection area to obtain a current binocular field-of-view projection area;

S400: calculating a mean value of the current binocular field-of-view projection area in the panoramic value map;

S500: comparing the mean value of the current binocular field-of-view projection area with a value threshold: if the mean value of the current binocular field-of-view projection area is greater than the value threshold, keeping the current binocular field-of-view projection area still, and using a high-value image currently captured by the left and right bionic eye cameras as an input for a SLAM system; and if the mean value of the current binocular field-of-view projection area is less than or equal to the value threshold, searching for a target binocular field-of-view projection area with the same size as the current binocular field-of-view projection area and a mean value higher than the value threshold in the panoramic value map, and proceeding to step S600; and S600: based on the current binocular field-of-view projection area and the target binocular field-of-view projection area, calculating required displacements for the left and right bionic eye cameras; moving the left and right bionic eye cameras according to the displacements, and finally using a high-value image captured by the left and right bionic eye cameras in the target binocular field-of-view projection area as an input for the SLAM system.

Preferably, the panoramic camera is capable of capturing scene information from a 360° surrounding environment. Furthermore, the panoramic camera is used to simulate peripheral vision of human eyes.

Preferably, in step S100, the key scene information is scene information that affects accuracy and robustness during execution of the SLAM task, and the key scene information includes feature points and dynamic objects.

Preferably, in step S100, the feature points are extracted using a Features from Accelerated Segment Test (FAST) keypoint detection algorithm; during feature point extraction, since feature matching is not required, calculation of Binary Robust Independent Elementary Features (BRIEF) descriptors in Oriented FAST and Rotated BRIEF (ORB) feature points extracted by a SLAM algorithm is omitted. Further, the FAST is a corner detection algorithm known for its high speed, primarily detecting places with significant local pixel intensity variations. It is based on the idea that if a pixel is significantly different from pixels in the vicinity (the pixel could be excessively bright or dark), this pixel is more likely to be a corner. A detection process of the FAST keypoint detection algorithm is as follows:

(1) selecting a pixel p in an image, where an intensity of the pixel is assumed to be $I_p$;

(2) setting a threshold T (e.g., 20% of $I_p$);

(3) selecting a circle of 16 pixels around the pixel p, with a radius being 3;
(4) if there exist N contiguous pixels on the selected circle which are all brighter than $I_p+T$, or all darker than $I_p-T$, considering the pixel p as a feature point (usually, N is set to 12, i.e., FAST-12); and
(5) repeating the above four steps for all the pixels.

Preferably, in step S100, the dynamic objects are detected using a YOLOv7 detection algorithm, and the dynamic objects are represented by detection target boxes. For dynamic object detection, the YOLOv7 detection algorithm is used to detect, in the panoramic image, dynamic objects like pedestrians and animals or potential dynamic objects that could have a negative impact on the map reuse.

Preferably, in step S200, a specific process of assigning values to the pixels in the panoramic image based on the key scene information includes: assigning high grayscale values to pixels located at feature points and pixels in the vicinity of the feature points in the panoramic image by using a pixel-wise assignment method, and assigning low grayscale values to all pixels located within the detection target boxes for the dynamic objects, where the grayscale values assigned to the pixels in the vicinity of feature points decrease as a neighborhood radius increases, and if a pixel is assigned multiple values, a maximum value assigned to the pixel is taken.

Furthermore, since the SLAM algorithm focuses on the feature points, the feature points and neighborhoods thereof are assigned high grayscale values, which are typically above 240. For a dynamic object that seriously degrades the performance of the SLAM algorithm, all pixels in a detection target box for the dynamic object are assigned low grayscale values, even lower than that of an area where no feature points are detected; the low grayscale values are typically lower than 80.

Preferably, in step S300, a specific process of projecting the field-of-view areas of the left and right bionic eye cameras separately onto the panoramic value map includes: calculating projection of the field-of-view areas (pixel planes) of the left and right bionic eye cameras on the panoramic value map (pixel plane) of the panoramic camera by using a projection equation of a normalized plane of the bionic eye camera and a projection equation of a normalized sphere of the panoramic camera.

More preferably, a specific process of calculating the projection of the pixel planes of the left and right bionic eye cameras on the pixel plane of the panoramic camera is as follows:

S301: Calculate projection coordinates of four vertex pixels $u_{L(0,0)}$, $u_{L(m,0)}$, $u_{L(m,n)}$, and $u_{L(0,n)}$ of the pixel plane of the left bionic eye camera on the normalized plane of the left bionic eye camera by using the projection equation of the normalized plane of the bionic eye camera, where the calculation formula is as follows:

$$P_{L(0,0)} = \rho_{CN}^{-1}(u_{L(0,0)}), P_{L(m,0)} = \rho_{CN}^{-1}(u_{L(m,0)})$$

$$P_{L(m,n)} = \rho_{CN}^{-1}(u_{L(m,n)}), P_{L(0,m)} = \rho_{CN}^{-1}(u_{L(0,n)})$$

where $\rho_{CN}(\bullet)$ is the projection equation of the normalized plane of the bionic eye camera, with m and n being maximum pixel coordinates in W and H directions of the pixel plane of the bionic eye camera.

S302: Establish a panoramic camera coordinate system with an aperture center of the panoramic camera as an origin, and transforming the four projection coordinates obtained in step S301 into the panoramic camera coordinate system by using the following formula:

$$P_{P(0,0)} = T_{LOP}^{-1}T_{LOL}P_{L(0,0)}, P_{P(m,0)} = T_{LOP}^{-1}T_{LOL}P_{L(m,0)}$$

$$P_{P(m,n)} = T_{LOP}^{-1}T_{LOL}P_{L(m,n)}, P_{P(0,n)} = T_{LOP}^{-1}T_{LOL}P_{L(0,n)}$$

where $T_{LOP}$ is a pose of the panoramic camera relative to an initial pose coordinate system of the left bionic eye camera (the initial pose coordinate system of the left bionic eye camera is established with an aperture center of the left bionic eye camera as an origin), and this transformation matrix is obtained through calibration; $T_{LOL}$ is a current pose of the left bionic eye camera relative to the initial pose coordinate system thereof, and this transformation matrix is obtained through a feedback control module of the bionic eye camera.

S303: In the panoramic camera coordinate system, connect the origin of the initial pose coordinate system of the left bionic eye camera (the origin of the coordinate system of the left bionic eye camera is the aperture center of the left bionic eye camera) with $P_{P(0,0)}$, $P_{P(m,0)}$, $P_{P(m,n)}$, and $P_{P(0,n)}$ to obtain four projection lines $L_{P1}$, $L_{P2}$, $L_{P3}$, and $L_{P4}$ representing four vertices of a field of view of the left bionic eye camera, where an equation of the four projection lines is as follows:

$$\frac{x_{Pi} - x_{PL0}}{a_i} = \frac{y_{Pi} - y_{PL0}}{b_i} = \frac{z_{Pi} - z_{PL0}}{c_i}, (i = 1,2,3,4)$$

where $P_1$ represents P(0,0); $P_2$ represents P(m,0); $P_3$ represents P(m,n); $P_4$ represents P(0,n); PLO represents the origin of the initial pose coordinate system of the left bionic eye camera; a, b, and c are constant parameters, each representing the number of directions of a line direction vector.

An equation of the normalized sphere of the panoramic camera is as follows:

$$x^2 + y^2 + z^2 = 1$$

Intersection points of the projection lines and the normalized sphere of the panoramic camera are obtained by combining the equations of the projection lines and the equation of the normalized sphere. Each line has two intersection points with the sphere, but because the bionic eye camera has a limited range of motion and cannot observe scenes within a range of x<0 in the panoramic camera coordinate system, only four intersection points $P_{P1}$, $P_{P2}$, $P_{P3}$, and $P_{P4}$ within a range of x>0 are retained, and these intersection points $P_{P1}$, $P_{P2}$, $P_{P3}$, and $P_{P4}$ are projection of the vertices of the pixel plane of the left bionic eye camera on the normalized sphere of the panoramic camera.

S304: Project the intersection points $P_{P1}$, $P_{P2}$, $P_{P3}$, and $P_{P4}$ onto the pixel plane of the panoramic camera by using a projection equation from the normalized sphere to the pixel plane of the panoramic camera, to obtain projection points of the intersection points $P_{P1}$, $P_{P2}$, $P_{P3}$, and $P_{P4}$, where the projection equation from the normalized sphere to the pixel plane of the panoramic camera, i.e., $\rho_{B \to I}(\bullet)$, is as follows:

$$u_{Pfi} = \rho_{B \to I}(P_{Pi}), (i = 1,2,3,4)$$

S305: Connect the projection points of the intersection points $P_{P1}$, $P_{P2}$, $P_{P3}$, and $P_{P4}$ to obtain the left field-of-view projection area (i.e., projection of the pixel plane of the left bionic eye camera on the pixel plane of the panoramic camera, also known as projection on the panoramic value map).

S306: Obtain the right field-of-view projection area of the right bionic eye camera following steps S301 to S305.

It should be noted that the left field-of-view projection area and the right field-of-view projection area are irregular quadrilaterals, and this is a distortion issue that occurs during a spherical projection process of the panoramic camera.

More preferably, in step S300, a specific process of controlling the left field-of-view projection area and the right field-of-view projection area to overlap with each other includes: controlling motion of the left and right bionic eye cameras by using a bionic eye motion control module, attempting to make the left field-of-view projection area and the right field-of-view projection area overlap with each other, in other words, controlling the left and right bionic eye cameras to approximately gaze at the same scene area. Furthermore, although the left field-of-view projection area and the right field-of-view projection area cannot completely overlap, the goal is to make them overlap as much as possible.

Preferably, in step S300, a specific process of merging the left field-of-view projection area and the right field-of-view projection area includes: taking a union of the left field-of-view projection area and the right field-of-view projection area to obtain a union area; and then generating a maximum bounding rectangle of the union area to obtain the current binocular field-of-view projection area.

Preferably, in step S400, a specific process of obtaining the mean value of the current binocular field-of-view projection area in the panoramic value map includes: based on value assignment results of the pixels in the panoramic value map, calculating a mean of values assigned to pixels within the current binocular field-of-view projection area to obtain the mean value of the current binocular field-of-view projection area.

Preferably, the value threshold $V_{th}$ is selected based on the number of successfully tracked feature points during the operation of the SLAM algorithm, in order to allow the motion control module to make accurate motion decisions. If the mean value $V_{mc}$ of the current binocular field-of-view projection area is greater than $V_{th}$, it means that the value of the scene in the current binocular field-of-view projection area is sufficient for the stable operation of the SLAM algorithm. Even if the binocular field-of-view projection area is moved to an area with a higher mean value $V_{mc}$, the improvement may be limited, and it may even affect the performance of SLAM due to motion-induced jitter. In this case, a gaze shift motion is omitted. If the mean value $V_{mc}$ of the current binocular field-of-view projection area is less than or equal to $V_{th}$, it means that the value of the scene in the current binocular field-of-view projection area is not sufficient to support the stable operation of the SLAM algorithm. This may be due to a lack of extractable feature points in the scene or the presence of dynamic objects in the scene. In this case, the gaze is shifted to a target binocular field-of-view projection area with a mean value higher than the value threshold $V_{th}$ and a closest distance to the current binocular field-of-view projection area in the current scene.

Preferably, in step S500, a specific process of searching for the target binocular field-of-view projection area with the mean value higher than the value threshold in the panoramic value map includes the following steps:

S501: Generate a rectangular box that has the same size and at the same position as the current binocular field-of-view projection area in the panoramic value map.

S502: Translate the current rectangular box by a step size s from near to far, and calculate a mean value within the rectangular box after each translation.

S503: Compare the mean value within the translated rectangular box with the value threshold: if the mean value within the translated rectangular box is higher than the value threshold, mark the translated rectangular box as the target binocular field-of-view projection area; and if the mean value within the translated rectangular box is lower than or equal to the value threshold, return to step S502, and set the current rectangular box as a last-translated rectangular box.

Preferably, in step S600, the displacement is an angular displacement, that is, the motion of the left and right bionic eye cameras is pure rotational motion without translation. Furthermore, when the displacement includes both angular and linear components, the motion of the left and right bionic eye cameras includes both rotation and translation.

Preferably, in step S600, a specific process of moving the left and right bionic eye cameras according to the displacements includes: controlling yaw and pitch angles of the left and right bionic eye cameras separately using motors, to move the left and right bionic eye cameras. Additionally, the motor can be controlled through a rotation command issued by the bionic eye control module.

Preferably, in step S600, a process of calculating the required displacements for the left and right bionic eye cameras includes: calculating a current pose of the left or right bionic eye camera in an initial pose coordinate system thereof by using the projection equation of the normalized plane of the left or right bionic eye camera; calculating, by using the projection equation from the normalized sphere of the panoramic camera to the pixel plane of the panoramic camera, a target pose of the left or right bionic eye camera for moving a field of view from the current binocular field-of-view projection area to the target binocular field-of-view projection area in the panoramic value map; and finally, based on the current pose and the target pose of the left or right bionic eye camera, calculating a rotation matrix $R_{CT}$ between the two poses, to obtain the required displacement for moving the field of view of the left or right bionic eye camera from the current binocular field-of-view projection area to the target binocular field-of-view projection area in the panoramic value map.

More preferably, in step S600, a specific process of calculating the required displacements for the left and right bionic eye cameras includes the following steps:

S601: Back-project center pixel coordinates $u_{PT}$ of the target binocular field-of-view projection area in the panoramic value map onto the normalized sphere of the panoramic camera by using the projection equation from the normalized sphere to the pixel plane of the panoramic camera, i.e., $\rho_{B \to I}(\bullet)$, to obtain a spherical target point; and then convert the spherical target point into the initial pose coordinate system of the left bionic eye camera, to obtain a target pose $P_{LOT}$ of the left bionic eye camera, where a specific calculation formula is as follows:

$$P_{LOT} = T_{LOP}\rho_{B \to I}^{-1}(u_{PT})$$

where $P_{LOT}$ represents the target pose that the left bionic eye camera needs to reach in order to move the field of view of the left bionic eye camera from the current binocular field-of-view projection area to the target binocular field-of-view projection area in the panoramic value map, and $u_{PT}$ represents the center pixel coordinates of the target binocular field-of-view projection area in the panoramic value map.

S602: Back-project a center point $u_{LC}=[m/2,n/2]^T$ of the pixel plane of the left bionic eye camera onto the normalized plane of the left bionic eye camera by using the projection equation of the normalized plane of the left bionic eye camera, i.e., $\rho_{CN}(\bullet)$, to obtain the current pose $P_{LOC}$ of the left bionic eye camera, where a specific calculation formula is as follows:

$$P_{LOC} = T_{LOL}\rho_{CN}^{-1}(u_{LC})$$

where $P_{LOC}$ represents the current pose of the left bionic eye camera in the initial pose coordinate system thereof, and $u_{LC}$ represents the center point of the pixel plane of the left bionic eye camera.

S603: Based on the obtained current pose and target pose of the left bionic eye camera, calculate the rotation matrix $R_{CT}$ between the two poses, with a specific calculation process as follows:

First, according to the definition of cross product, a rotation axis of the rotation between two vectors is calculated as follows:

$$n_{CT} = \frac{P_{LOC} \times P_{LOT}}{\|P_{LOC} \times P_{LOT}\|}$$

As the rotation axis in the rotation vector is a unit vector, a resulting vector after the cross product in the foregoing equation is normalized.

Then, a rotation angle is calculated based on the following equation:

$$\theta_{CT} = \mathrm{accoss}\frac{P_{LOC} \cdot P_{LOT}}{\|P_{LOC}\| \|P_{LOT}\|}$$

Finally, based on the rotation axis $n_{CT}$ and the rotation angle $\theta_{CT}$ of the rotation vector, the rotation matrix $R_{CT}$ is obtained using the Rodrigues formula:

$$R_{CT} = \cos\theta_{CT} I + (1 - \cos\theta_{CT}) n_{CT} n_{CT}^T + \sin\theta_{CT} \hat{n}_{CT}$$

This allows the calculation of the angular displacement required for moving the field of view of the left bionic eye camera from the current binocular field-of-view projection area to the target binocular field-of-view projection area in the panoramic value map.

S604: Based on steps S601 to S603 described above, obtain an angular displacement required for moving the field of view of the right bionic eye camera the current binocular field-of-view projection area to the target binocular field-of-view projection area in the panoramic value map.

It should be noted that when the panoramic camera continues to capture the next image, the left and right bionic eye cameras will repeat the above positioning method to find the next target gaze area, to obtain a high-value image suitable for input into the SLAM system.

According to a second aspect, the present disclosure provides an electronic device, including a memory and a processor, where the processor stores a computer program, and the computer program is executed by the processor to implement any step in the active positioning method for bionic binocular vision during execution of a SLAM task as described in the first aspect.

According to a third aspect, the present disclosure provides a computer readable storage medium storing a computer program, where the computer program is executed by a processor to implement any step in the active positioning method for bionic binocular vision during execution of a SLAM task as described in the first aspect.

Compared with the prior art, the present disclosure has the following beneficial effects:

(1) The present disclosure addresses the issue of tracking failure due to sparse textures or a high number of dynamic objects when a robot executes SLAM in an unknown environment. Based on the peripheral and central vision perception mechanisms of human eyes, a panoramic camera is employed to simulate peripheral vision, a panoramic value map is constructed based on the panoramic camera to guide active gaze control for binocular bionic eyes, and a binocular bionic eye gaze control strategy based on the panoramic value map is proposed. This helps capture high-texture key information from visual information of the entire unknown scene. Specifically, in the present disclosure, feature points are first extracted from the entire scene using the FAST corner detection algorithm, while dynamic objects in the scene are detected using YOLOv7. Then, higher values are assigned to feature points in the panoramic image and pixels in surrounding neighborhoods using pixel-wise assignment, with values gradually decreasing as the neighborhood radius increases, while pixels in a detection target box for the dynamic object are assigned low values, thus obtaining a panoramic value map. Projection of a gaze area of the bionic eye camera in the panoramic value map is calculated using the projection equation of the normalized plane of the bionic eye camera and the equation for projection from the spherical plane to the pixel plane of the panoramic camera. The value of the scene in the currently gazed area is evaluated using a system-defined value threshold $V_{th}$. Finally, the Rodrigues formula is employed to calculate the rotational motion required for the bionic eye to move from the current pose to the target pose. In one embodiment, the positioning method of the present disclosure ensures a continuous robot trajectory without tracking failures, effectively enhancing the stability of the SLAM system.

(2) The present disclosure uses panoramic images captured by the panoramic camera to simulate the peripheral vision of human eyes. By customizing the value assignment in the panoramic image, a high-value image is obtained. Then, the binocular camera will always focus on the high-value area, thereby improving the ability of the system to obtain high-value information in the scene. This is particularly valuable during execution of a SLAM task, as it prevents tracking loss of the SLAM system in scenarios where the camera captures images with sparse textures or a high number of dynamic objects. This, in turn, enhances the stability of the SLAM system, such that the visual SLAM method can achieve accurate localization and mapping in unknown environments. The method of the present disclosure holds significant practical value and can be widely applied in fields such as robot navigation and autonomous driving, providing strong support for technological innovation and progress in related industries.

Other advantages, objectives and features of the present invention will be illustrated in the subsequent description in some degree, and will be apparent to those skilled in the art in some degree based on study on the following description, or those skilled in the art may obtain teachings by practicing the present invention. The objectives and other advantages of the present disclosure can be implemented and obtained by the description below.

DETAILED DESCRIPTION OF THE EMBODIMENTS

To make the objectives, technical solutions, and advantages of the present disclosure clearer, the following describes the present disclosure in more detail with reference to the accompanying drawings. It should be understood that the specific examples described herein are merely intended to explain the present disclosure, but not to limit the present disclosure.

It should be noted that embodiments in the present disclosure or features in the embodiments may be combined with one another without conflict. The present disclosure will be described in detail below with reference to the drawings and the embodiments.

Embodiment 1

This embodiment provides an active positioning method for bionic binocular vision during execution of a SLAM task, including the following steps:

S100: Capture a panoramic image using a panoramic camera capable of capturing scene information from a 360° surrounding environment, and detect key scene information in the panoramic image that influences operation accuracy and robustness of SLAM, such as feature points and dynamic objects.

The feature points are extracted using a FAST keypoint detection algorithm. During feature point extraction, since feature matching is not required, calculation of BRIEF descriptors in ORB feature points extracted by a SLAM algorithm is omitted. Further, the FAST is a corner detection algorithm known for its high speed, primarily detecting places with significant local pixel intensity variations. It is based on the idea that if a pixel is significantly different from pixels in the vicinity (the pixel could be excessively bright or dark), this pixel is more likely to be a corner. A detection process of the FAST keypoint detection algorithm is as follows:

(1) selecting a pixel p in an image, where an intensity of the pixel is assumed to be $I_p$;
(2) setting a threshold T (e.g., 20% of $I_p$);
(3) selecting a circle of 16 pixels around the pixel p, with a radius being 3;
(4) if there exist N contiguous pixels on the selected circle which are all brighter than $I_p+T$, or all darker than $I_p-T$, considering the pixel p as a feature point (usually, N is set to 12, i.e., FAST-12); and
(5) repeating the above four steps for all the pixels.

The dynamic objects are detected using a YOLOv7 detection algorithm, and the dynamic objects are represented by detection target boxes. For dynamic object detection, the YOLOv7 detection algorithm is used to detect, in the panoramic image, dynamic objects like pedestrians and animals or potential dynamic objects that could have a negative impact on the map reuse.

Figure 1:
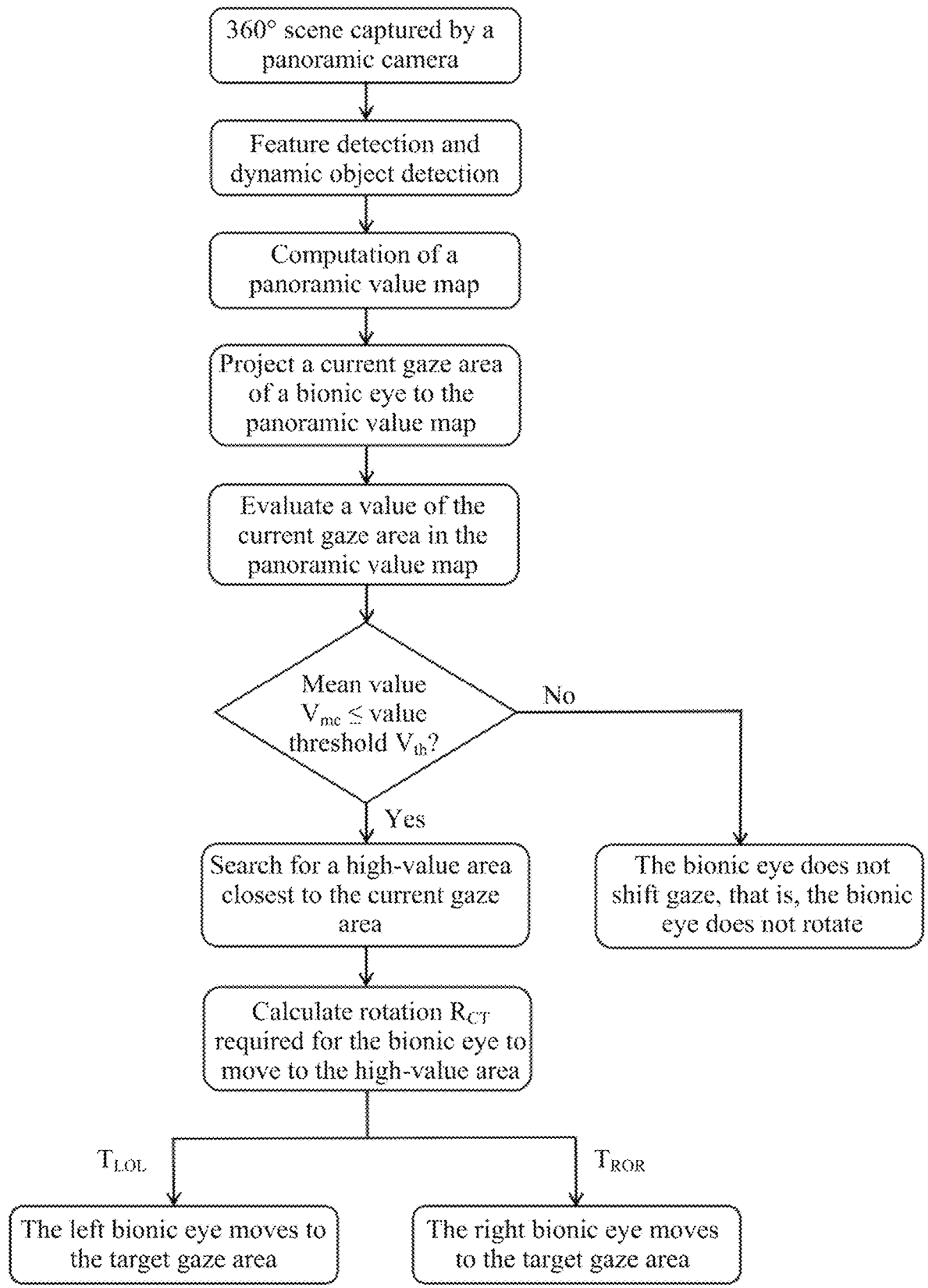
FIG. 1 is a design flowchart of an active positioning method for bionic binocular vision according to an embodiment of the present disclosure.
Figure 2:
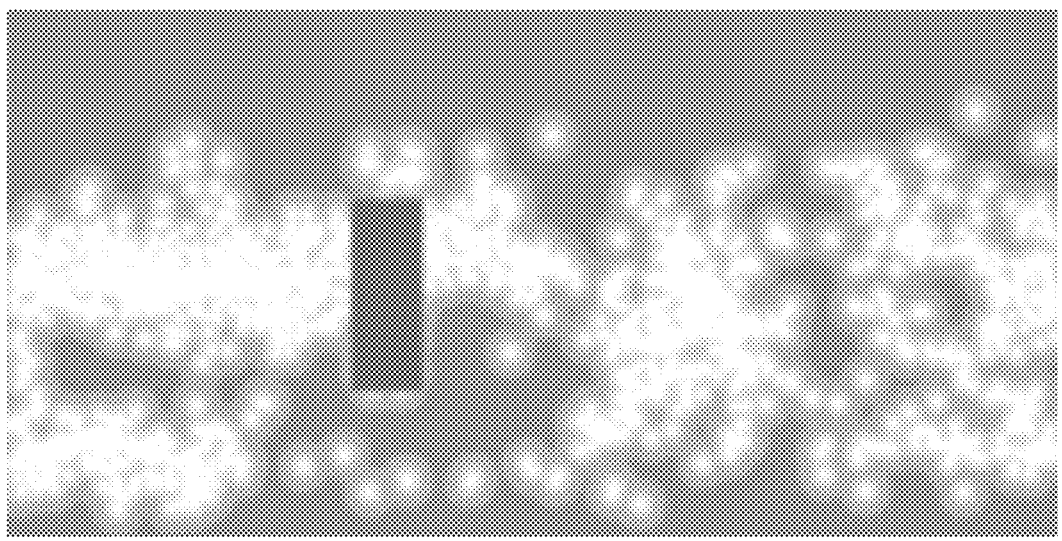
FIG. 2 is a panoramic value map in Embodiment 1 of the present disclosure, where the rectangular box represents a detected dynamic objects, and all pixels within are assigned low pixel values.

S200: Assign values to pixels in the panoramic image based on the key scene information, to obtain a panoramic value map, as shown in FIG. 2.

A specific process of assigning values to the pixels in the panoramic image based on the key scene information includes: assigning high grayscale values to pixels located at feature points and pixels in the vicinity of the feature points in the panoramic image by using a pixel-wise assignment method, and assigning low grayscale values to all pixels located within the detection target boxes for the dynamic objects, where the grayscale values assigned to the pixels in the vicinity of feature points decrease as a neighborhood radius increases, and if a pixel is assigned multiple values, a maximum value assigned to the pixel is taken.

Furthermore, since the SLAM algorithm focuses on the feature points, the feature points and neighborhoods thereof are assigned high grayscale values, which are typically above 240. For a dynamic object that seriously degrades the performance of the SLAM algorithm, all pixels in a detection target box for the dynamic object are assigned low grayscale values, even lower than that of an area where no feature points are detected; the low grayscale values are typically lower than 80.

Figure 3:
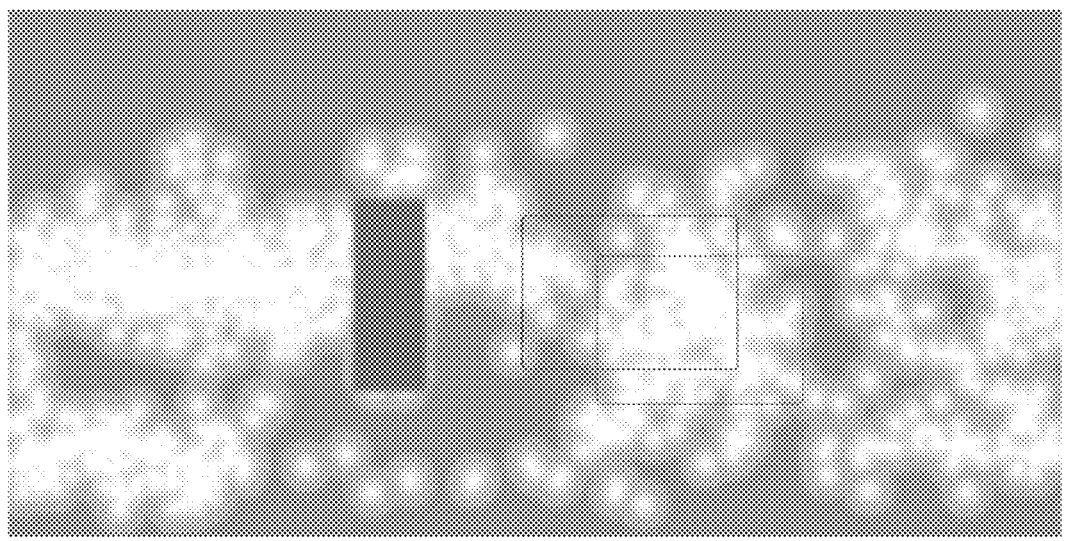
FIG. 3 is a schematic diagram illustrating that a panoramic value map guides gaze control of left and right bionic eye cameras according to the present disclosure, where the left rectangular box represents a current binocular field-of-view projection area of the left and right bionic eye cameras, and the right rectangular box represents a target binocular field-of-view projection area of the left and right bionic eye cameras.

S300: Project field-of-view areas of left and right bionic eye cameras separately onto the panoramic value map, to obtain a left field-of-view projection area and a right field-of-view projection area; control the left field-of-view projection area and the right field-of-view projection area to overlap with each other; and merge the left field-of-view projection area and the right field-of-view projection area to obtain a current binocular field-of-view projection area, as shown by the left rectangular box in FIG. 3.

A specific process of projecting the field-of-view areas of the left and right bionic eye cameras separately onto the panoramic value map includes: calculating projection of the field-of-view areas (pixel planes) of the left and right bionic eye cameras on the panoramic value map (pixel plane) of the panoramic camera by using a projection equation of a normalized plane of the bionic eye camera and a projection equation of a normalized sphere of the panoramic camera.

Further, a specific process of calculating the projection of the pixel planes of the left and right bionic eye cameras on the pixel plane of the panoramic camera is as follows:

S301: Calculate projection coordinates of four vertex pixels $u_{L(0,0)}$, $u_{L(m,0)}$, $u_{L(m,n)}$, and $u_{L(0,n)}$ of the pixel plane of the left bionic eye camera on the normalized plane of the left bionic eye camera by using the projection equation of the normalized plane of the bionic eye camera, where the calculation formula is as follows:

$$P_{L(0,0)} = \rho_{CN}^{-1}(u_{L(0,0)}), P_{L(m,0)} = \rho_{CN}^{-1}(u_{L(m,0)})$$

$$P_{L(m,n)} = \rho_{CN}^{-1}(u_{L(m,n)}), P_{L(0,n)} = \rho_{CN}^{-1}(u_{L(0,n)})$$

where $\rho_{CN}(\bullet)$ is the projection equation of the normalized plane of the bionic eye camera, with m and n being maximum pixel coordinates in W and H directions of the pixel plane of the bionic eye camera.

S302: Establish a panoramic camera coordinate system with an aperture center of the panoramic camera as an origin, and transforming the four projection coordinates obtained in step S301 into the panoramic camera coordinate system by using the following formula:

$$P_{P(0,0)} = T_{LOP}^{-1} T_{LOL} P_{L(0,0)}, P_{P(m,0)} = T_{LOP}^{-1} T_{LOL} P_{L(m,0)}$$

$$P_{P(m,n)} = T_{LOP}^{-1} T_{LOL} P_{L(m,n)}, P_{P(0,n)} = T_{LOP}^{-1} T_{LOL} P_{L(0,n)}$$

where $T_{LOP}$ is a pose of the panoramic camera relative to an initial pose coordinate system of the left bionic eye camera (the initial pose coordinate system of the left bionic eye camera is established with an aperture center of the left bionic eye camera as an origin), and this transformation matrix is obtained through calibration; $T_{LOL}$ is a current pose of the left bionic eye camera relative to the initial pose coordinate system thereof, and this transformation matrix is obtained through a feedback control module of the bionic eye camera.

S303: In the panoramic camera coordinate system, connect the origin of the initial pose coordinate system of the left bionic eye camera (the origin of the coordinate system of the left bionic eye camera is the aperture center of the left bionic eye camera) with $P_{P(0,0)}$, $P_{P(m,0)}$, $P_{P(m,n)}$, and $P_{P(0,n)}$ to obtain four projection lines $L_{P1}$, $L_{P2}$, $L_{P3}$, and $L_{P4}$ representing four vertices of a field of view of the left bionic eye camera, where an equation of the four projection lines is as follows:

$$\frac{x_{Pi} - x_{PL0}}{a_i} = \frac{y_{Pi} - y_{PL0}}{b_i} = \frac{z_{Pi} - z_{PL0}}{c_i}, (i = 1, 2, 3, 4)$$

where $P_1$ represents P(0,0); $P_2$ represents P(m,0); $P_3$ represents P(m,n); $P_4$ represents P(0,n); PL0 represents the origin of the initial pose coordinate system of the left bionic eye camera; a, b, and c are constant parameters, each representing the number of directions of a line direction vector.

An equation of the normalized sphere of the panoramic camera is as follows:

$$x^2 + y^2 + z^2 = 1$$

Intersection points of the projection lines and the normalized sphere of the panoramic camera are obtained by combining the equations of the projection lines and the equation of the normalized sphere. Each line has two intersection points with the sphere, but because the bionic eye camera has a limited range of motion and cannot observe scenes within a range of x<0 in the panoramic camera coordinate system, only four intersection points $P_{P1}$, $P_{P2}$, $P_{P3}$, and $P_{P4}$ within a range of x>0 are retained, and these intersection points $P_{P1}$, $P_{P2}$, $P_{P3}$, and $P_{P4}$ are projection of the vertices of the pixel plane of the left bionic eye camera on the normalized sphere of the panoramic camera.

S304: Project the intersection points $P_{P1}$, $P_{P2}$, $P_{P3}$, and $P_{P4}$ onto the pixel plane of the panoramic camera by using a projection equation from the normalized sphere to the pixel plane of the panoramic camera, to obtain projection points of the intersection points $P_{P1}$, $P_{P2}$, $P_{P3}$, and $P_{P4}$, where the projection equation from the normalized sphere to the pixel plane of the panoramic camera, i.e, $\rho_{B \to I}(\bullet)$, is as follows:

$$u_{PIi} = \rho_{B \to I}(P_{Pi}), (i = 1, 2, 3, 4)$$

S305: Connect the projection points of the intersection points $P_{P1}$, $P_{P2}$, $P_{P3}$, and $P_{P4}$ to obtain the left field-of-view projection area (i.e., projection of the pixel plane of the left bionic eye camera on the pixel plane of the panoramic camera, also known as projection on the panoramic value map).

S306: Obtain the right field-of-view projection area of the right bionic eye camera following steps S301 to S305.

It should be noted that the left field-of-view projection area and the right field-of-view projection area are irregular quadrilaterals, and this is a distortion issue that occurs during a spherical projection process of the panoramic camera.

A specific process of controlling the left field-of-view projection area and the right field-of-view projection area to overlap with each other includes: controlling motion of the left and right bionic eye cameras by using a bionic eye motion control module, attempting to make the left field-of-view projection area and the right field-of-view projection area overlap with each other, in other words, controlling the left and right bionic eye cameras to approximately gaze at the same scene area. Furthermore, although the left field-of-view projection area and the right field-of-view projection area cannot completely overlap, the goal is to make them overlap as much as possible.

Further, a specific process of merging the left field-of-view projection area and the right field-of-view projection area includes: taking a union of the left field-of-view projection area and the right field-of-view projection area to obtain a union area; and then generating a maximum bounding rectangle of the union area to obtain the current binocular field-of-view projection area.

Step S400 of obtaining the mean value of the current binocular field-of-view projection area in the panoramic value map includes: based on value assignment results of the pixels in the panoramic value map, calculating a mean of values assigned to pixels within the current binocular field-of-view projection area to obtain the mean value of the current binocular field-of-view projection area.

The value threshold $V_{th}$ is selected based on the number of successfully tracked feature points during the operation of the SLAM algorithm, in order to allow the motion control module to make accurate motion decisions. If the mean value $V_{mc}$ of the current binocular field-of-view projection area is greater than $V_{th}$, it means that the value of the scene in the current binocular field-of-view projection area is sufficient for the stable operation of the SLAM algorithm. Even if the binocular field-of-view projection area is moved to an area with a higher mean value $V_{mc}$, the improvement may be limited, and it may even affect the performance of SLAM due to motion-induced jitter. In this case, a gaze shift motion is omitted. If the mean value $V_{mc}$ of the current binocular field-of-view projection area is less than or equal to $V_{th}$, it means that the value of the scene in the current binocular field-of-view projection area is not sufficient to support the stable operation of the SLAM algorithm. This may be due to a lack of extractable feature points in the scene or the presence of dynamic objects in the scene. In this case, the gaze is shifted to a target binocular field-of-view projection area with a mean value higher than the value threshold $V_{th}$ and a closest distance to the current binocular field-of-view projection area in the current scene.

S500: Compare the mean value of the current binocular field-of-view projection area with a value threshold: if the mean value of the current binocular field-of-view projection area is greater than the value threshold, keep the current binocular field-of-view projection area still, and use a high-value image currently captured by the left and right bionic eye cameras as an input for a SLAM system; and if the mean value of the current binocular field-of-view projection area is less than or equal to the value threshold, search for a target binocular field-of-view projection area (as shown by the right rectangular box in FIG. 3) with the same size as the current binocular field-of-view projection area and a mean value higher than the value threshold in the panoramic value map, and proceed to step S600.

A specific process of searching for the target binocular field-of-view projection area with the mean value higher than the value threshold in the panoramic value map includes the following steps:

S501: Generate a rectangular box that has the same size and at the same position as the current binocular field-of-view projection area in the panoramic value map.

S502: Translate the current rectangular box by a step size s from near to far, and calculate a mean value within the rectangular box after each translation.

S503: Compare the mean value within the translated rectangular box with the value threshold: if the mean value within the translated rectangular box is higher than the value threshold, mark the translated rectangular box as the target binocular field-of-view projection area; and if the mean value within the translated rectangular box is lower than or equal to the value threshold, return to step S502, and set the current rectangular box as a last-translated rectangular box.

S600: Based on the current binocular field-of-view projection area and the target binocular field-of-view projection area, calculate required displacements for the left and right bionic eye cameras; move the left and right bionic eye cameras according to the displacements, and then use a high-value image currently captured by the left and right bionic eye cameras as an input for the SLAM system.

The displacement is an angular displacement, that is, the motion of the left and right bionic eye cameras is pure rotational motion without translation.

A process of calculating the required angular displacements for the left and right bionic eye cameras includes: calculating a current pose of the left or right bionic eye camera in an initial pose coordinate system thereof by using the projection equation of the normalized plane of the left or right bionic eye camera; calculating, by using the projection equation from the normalized sphere of the panoramic camera to the pixel plane of the panoramic camera, a target pose of the left or right bionic eye camera for moving the field of view from the current binocular field-of-view projection area to the target binocular field-of-view projection area in the panoramic value map; and finally, based on the current pose and the target pose of the left or right bionic eye camera, calculating a rotation matrix $R_{CT}$ between the two poses, thereby obtaining the required angular displacement for moving the field of view of the left or right bionic eye camera from the current binocular field-of-view projection area to the target binocular field-of-view projection area in the panoramic value map.

Further, a specific process of calculating the required displacements for the left and right bionic eye cameras includes the following steps:

S601: Back-project center pixel coordinates $u_{PT}$ of the target binocular field-of-view projection area in the panoramic value map onto the normalized sphere of the panoramic camera by using the projection equation from the normalized sphere to the pixel plane of the panoramic camera, i.e., $\rho_{B \to I}(\bullet)$, to obtain a spherical target point; and then convert the spherical target point into the initial pose coordinate system of the left bionic eye camera, to obtain a target pose $P_{LOT}$ of the left bionic eye camera, where a specific calculation formula is as follows:

$$P_{LOT} = T_{LOP}\rho_{B \to I}^{-1}(u_{PT})$$

where $P_{LOT}$ represents the target pose that the left bionic eye camera needs to reach in order to move the field of view of the left bionic eye camera from the current binocular field-of-view projection area to the target binocular field-of-view projection area in the panoramic value map, and $u_{PT}$ represents the center pixel coordinates of the target binocular field-of-view projection area in the panoramic value map.

S602: Back-project a center point $u_{LC}=[m/2,n/2]^T$ of the pixel plane of the left bionic eye camera onto the normalized plane of the left bionic eye camera by using the projection equation of the normalized plane of the left bionic eye camera, i.e., $\rho_{CN}(\bullet)$, to obtain the current pose $P_{LOC}$ of the left bionic eye camera, where a specific calculation formula is as follows:

$$P_{LOC} = T_{LOL}\rho_{CN}^{-1}(u_{LC})$$

where $P_{LOC}$ represents the current pose of the left bionic eye camera in the initial pose coordinate system thereof, and $u_{LC}$ represents the center point of the pixel plane of the left bionic eye camera.

S603: Based on the obtained current pose and target pose of the left bionic eye camera, calculate the rotation matrix $R_{CT}$ between the two poses, with a specific calculation process as follows:

First, according to the definition of cross product, a rotation axis of the rotation between two vectors is calculated as follows:

$$n_{CT} = \frac{P_{LOC} \times P_{LOT}}{\|P_{LOC} \times P_{LOT}\|}$$

As the rotation axis in the rotation vector is a unit vector, a resulting vector after the cross product in the foregoing equation is normalized.

Then, a rotation angle is calculated based on the following equation:

$$\theta_{CT} = \text{accoss}\frac{P_{LOC} \cdot P_{LOT}}{\|P_{LOC}\|\|P_{LOT}\|}$$

Finally, based on the rotation axis $n_{CT}$ and the rotation angle $\theta_{CT}$ of the rotation vector, the rotation matrix $R_{CT}$ is obtained using the Rodrigues formula:

$$R_{CT} = \cos\theta_{CT} I + (1 - \cos\theta_{CT}) n_{CT} n_{CT}^T + \sin\theta_{CT} \hat{n}_{CT}$$

This allows the calculation of the angular displacement required for moving the field of view of the left bionic eye camera from the current binocular field-of-view projection area to the target binocular field-of-view projection area in the panoramic value map.

S604: Based on steps S601 to S603 described above, obtain an angular displacement required for moving the field of view of the right bionic eye camera the current binocular field-of-view projection area to the target binocular field-of-view projection area in the panoramic value map.

A specific process of moving the left and right bionic eye cameras according to the displacements includes: controlling yaw and pitch angles of the left and right bionic eye cameras separately using motors, to move the left and right bionic eye cameras. Additionally, the motor can be controlled through a rotation command issued by the bionic eye control module.

It should be noted that when the panoramic camera continues to capture the next image, the left and right bionic eye cameras will be re-positioned by repeating the above positioning method, to obtain a high-value image suitable for input into the SLAM system.

Figure 4:
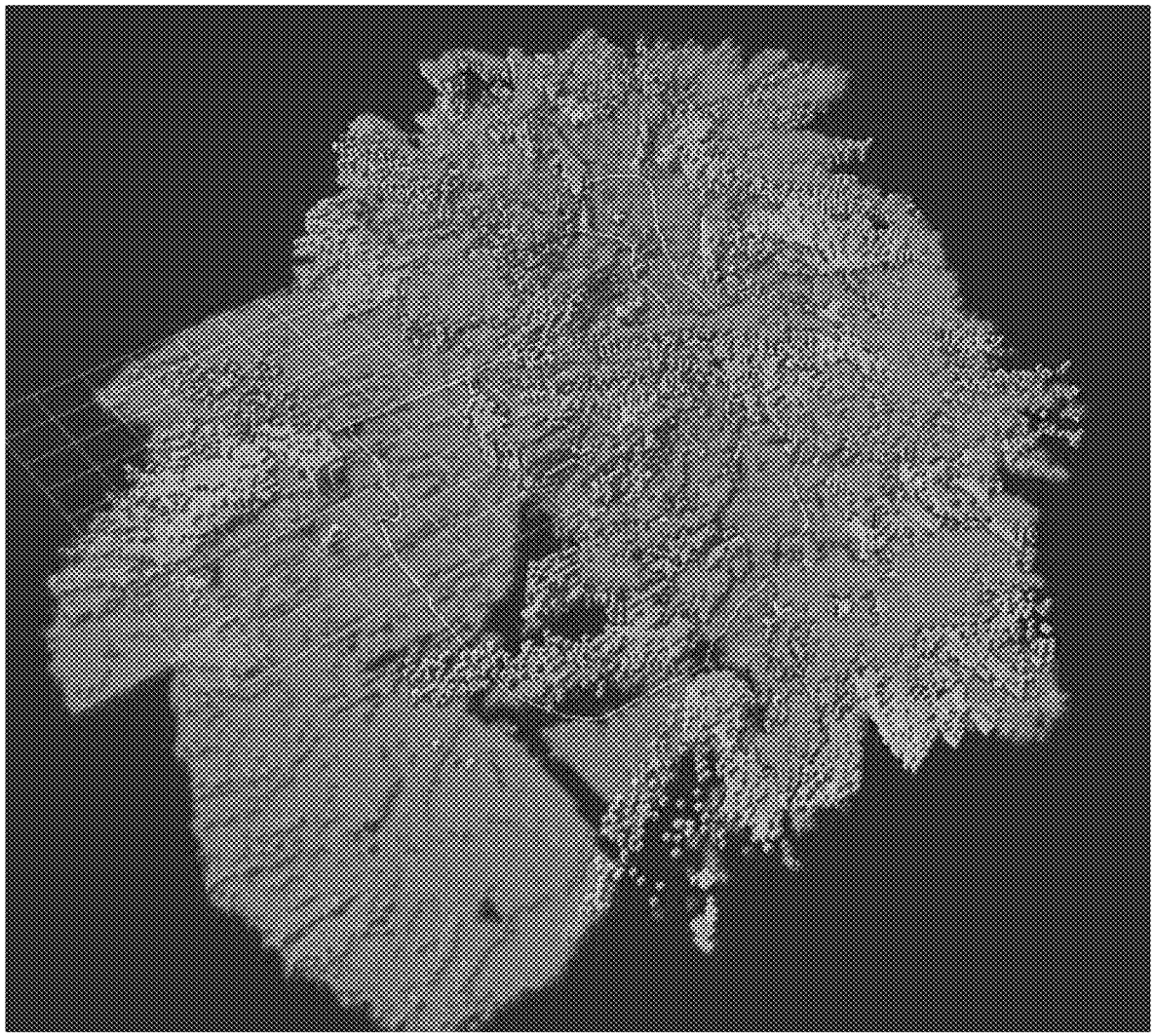
FIG. 4 shows experimental results of a robot executing a SLAM task in a bush scene according to Embodiment 1 of the present disclosure.

FIG. 4 shows an octree map built by a robot after executing a SLAM task in a bush scene by using the positioning method of the present disclosure. It can be seen from FIG. 4 that, the result of a mobile robot running a complete loop in a complex bush environment is as follows: the trajectory of the robot was continuous, with no trajectory breakpoints observed, indicating no SLAM tracking loss. This result was replicated in four different small bushes. In contrast, robots not using the positioning method of the present disclosure experienced two instances of trajectory breakpoints while performing SLAM tasks in the aforementioned five small bushes. Therefore, the positioning method of the present disclosure has achieved the technical effect of improving SLAM tracking stability.

Embodiment 2

An electronic device includes a memory and a processor. The processor stores a computer program, and the computer program is executed by the processor to implement any step in the active positioning method for bionic binocular vision during execution of a SLAM task as described in Embodiment 1.

Embodiment 3

A computer readable storage medium storing a computer program. The computer program is executed by a processor to implement any step in the active positioning method for bionic binocular vision during execution of a SLAM task as described in Embodiment 1.

In conclusion, the present disclosure effectively overcomes the shortcomings of the prior art and has high industrial value. The foregoing embodiments are intended to illustrate the substantive content of the present disclosure, but they do not limit the protection scope of the present disclosure. Those of ordinary skill in the art should understand that modifications or equivalent substitutions may be made to the technical solutions of the present disclosure without departing from the substance and scope of the technical solutions of the present disclosure.

What is claimed is:

1. An active positioning method for bionic binocular vision during execution of a simultaneous localization and mapping (SLAM) task, comprising:
capturing a panoramic image using a panoramic camera and detecting key scene information in the panoramic image of a SLAM task;
assigning values to pixels in the panoramic image based on the key scene information, to obtain a panoramic value map;
projecting field-of-view areas of left and right bionic eye cameras separately onto the panoramic value map, to obtain a left field-of-view projection area and a right field-of-view projection area; controlling the left field-of-view projection area and the right field-of-view projection area to overlap with each other; and merging the left field-of-view projection area and the right field-of-view projection area to obtain a current binocular field-of-view projection area;
calculating a mean value of the current binocular field-of-view projection area in the panoramic value map;
comparing the mean value of the current binocular field-of-view projection area with a value threshold: if the mean value of the current binocular field-of-view projection area is greater than the value threshold, keeping the current binocular field-of-view projection area still, and using a high-value image currently captured by the left and right bionic eye cameras as an input for a SLAM system; and if the mean value of the current binocular field-of-view projection area is less than or equal to the value threshold, searching for a target binocular field-of-view projection area with a mean value higher than the value threshold in the panoramic value map; and
based on the current binocular field-of-view projection area and the target binocular field-of-view projection area, calculating required displacements for the left and right bionic eye cameras; moving the left and right bionic eye cameras according to the displacements, and finally using a high-value image captured by the left and right bionic eye cameras in the target binocular field-of-view projection area as an input for the SLAM system.

2. The active positioning method according to claim 1, wherein the key scene information comprises feature points and dynamic objects; the feature points are extracted using a Features from Accelerated Segment Test (FAST) keypoint detection algorithm; and the dynamic objects are detected using a You Only Look Once (YOLOv7) detection algorithm, to obtain detection target boxes for the dynamic objects.

3. The active positioning method according to claim 2, wherein assigning values to the pixels in the panoramic image based on the key scene information further comprises:

assigning high pixel values to pixels located at feature points and pixels in the vicinity of the feature points in the panoramic image by using a pixel-wise assignment method, and assigning low pixel values to all pixels located within the detection target boxes for the dynamic objects, wherein the pixel values assigned to the pixels in the vicinity of feature points decrease as a neighborhood radius increases, and if a pixel is assigned multiple values, a maximum value assigned to the pixel is taken.

4. The active positioning method according to claim 3, wherein projecting the field-of-view areas of the left and right bionic eye cameras separately onto the panoramic value map further comprises: calculating projection of the field-of-view areas of the left and right bionic eye cameras on the panoramic value map of the panoramic camera by using a projection equation of a normalized plane of the bionic eye camera and a projection equation of a normalized sphere of the panoramic camera.

5. The active positioning method according to claim 4, wherein merging the left field-of-view projection area and the right field-of-view projection area further comprises: taking a union of the left field-of-view projection area and the right field-of-view projection area to obtain a union area; and generating a maximum bounding rectangle of the union area to obtain the current binocular field-of-view projection area.

6. The active positioning method according to claim 5, wherein obtaining the mean value of the current binocular field-of-view projection area in the panoramic value map further comprises: based on value assignment results of the pixels in the panoramic value map, calculating a mean of values assigned to pixels within the current binocular field-of-view projection area to obtain the mean value of the current binocular field-of-view projection area.

7. The active positioning method according to claim 6, wherein searching for the target binocular field-of-view projection area with the mean value higher than the value threshold in the panoramic value map further comprises:
generating a rectangular box that has the same size and at the same position as the current binocular field-of-view projection area in the panoramic value map;
translating the current rectangular box by a step size s from near to far, and calculating a mean value within the rectangular box after each translation; and
comparing the mean value within the translated rectangular box with the value threshold: if the mean value within the translated rectangular box is higher than the value threshold, marking the translated rectangular box as the target binocular field-of-view projection area; and if the mean value within the translated rectangular box is lower than or equal to the value threshold, and setting the current rectangular box as a last-translated rectangular box.

8. The active positioning method according to claim 7, wherein, the displacement is an angular displacement, and a process of calculating the required displacements for the left and right bionic eye cameras further comprises: calculating a current pose of the left or right bionic eye camera in an initial pose coordinate system thereof by using the projection equation of the normalized plane of the left or right bionic eye camera; calculating, by using the projection equation from the normalized sphere of the panoramic camera to the pixel plane of the panoramic camera, a target pose of the left or right bionic eye camera for moving a field of view from the current binocular field-of-view projection area to the target binocular field-of-view projection area in the panoramic value map; and based on the current pose and the target pose of the left or right bionic eye camera, calculating a rotation matrix RcT between the two poses, to obtain the required displacement for moving the field of view of the left or right bionic eye camera from the current binocular field-of-view projection area to the target binocular field-of-view projection area in the panoramic value map.

9. An electronic device, comprising a memory and a processor, wherein the memory stores a computer program, and the computer program is executed by the processor to implement the active positioning method for bionic binocular vision during execution of a SLAM task according to claim 1.

10. A non-transitory computer readable storage medium storing a computer program, wherein the computer program is executed by a processor to implement the active positioning method for bionic binocular vision during execution of a SLAM task according to claim 1.

11. An electronic device, comprising a memory and a processor, wherein the memory stores a computer program, and the computer program is executed by the processor to implement the active positioning method for bionic binocular vision during execution of a SLAM task according to claim 2.

12. An electronic device, comprising a memory and a processor, wherein the memory stores a computer program, and the computer program is executed by the processor to implement the active positioning method for bionic binocular vision during execution of a SLAM task according to claim 3.

13. An electronic device, comprising a memory and a processor, wherein the memory stores a computer program, and the computer program is executed by the processor to implement the active positioning method for bionic binocular vision during execution of a SLAM task according to claim 4.

14. An electronic device, comprising a memory and a processor, wherein the memory stores a computer program, and the computer program is executed by the processor to implement the active positioning method for bionic binocular vision during execution of a SLAM task according to claim 5.

15. An electronic device, comprising a memory and a processor, wherein the memory stores a computer program, and the computer program is executed by the processor to implement the active positioning method for bionic binocular vision during execution of a SLAM task according to claim 6.

16. An electronic device, comprising a memory and a processor, wherein the memory stores a computer program, and the computer program is executed by the processor to implement the active positioning method for bionic binocular vision during execution of a SLAM task according to claim 7.

17. An electronic device, comprising a memory and a processor, wherein the memory stores a computer program, and the computer program is executed by the processor to implement the active positioning method for bionic binocular vision during execution of a SLAM task according to claim 8.

18. A non-transitory computer readable storage medium storing a computer program, wherein the computer program is executed by a processor to implement the active positioning method for bionic binocular vision during execution of a SLAM task according to claim 2.

19. A non-transitory computer readable storage medium storing a computer program, wherein the computer program is executed by a processor to implement the active positioning method for bionic binocular vision during execution of a SLAM task according to claim 3.

20. A non-transitory computer readable storage medium storing a computer program, wherein the computer program is executed by a processor to implement the active positioning method for bionic binocular vision during execution of a SLAM task according to claim 4.

* * * * *